:::patent
United States Patent Office

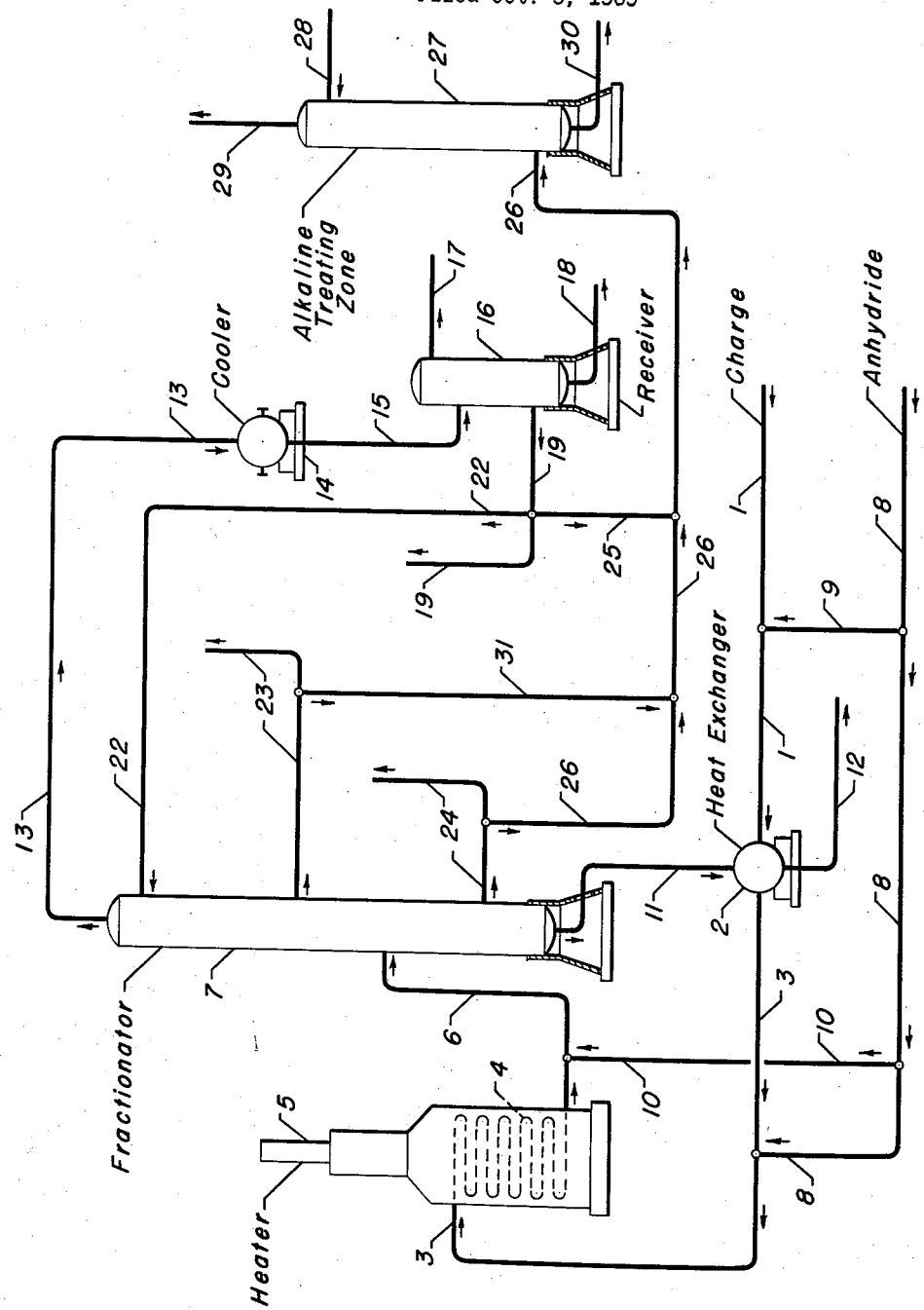

3,023,160
Patented Feb. 27, 1962
:::

3,023,160
REFINING OF HYDROCARBONS
Russell F. Stedman, Des Plaines, Ill., assignor to Universal Oil Products Company, Des Plaines, Ill., a corporation of Delaware
Filed Oct. 9, 1959, Ser. No. 845,567
4 Claims. (Cl. 208—240)

This invention relates to a novel method of treating hydrocarbons to convert non-hydrocarbon impurities contained therein.

Hydrocarbon oils, including crude oil and various fractions derived therefrom, containing non-hydrocarbon impurities as, for example, nitrogen-containing compounds, sulfur-containing compounds and oxygen-containing compounds. In accordance with the novel process of the present invention, these non-hydrocarbon impurities are converted into higher boiling reaction products and are transferred to and commingled with the higher boiling hydrocarbon products, thus removing them from the more valuable lower boiling hydrocarbons.

Acetic and other organic acid anhydrides will react with the non-hydrocarbon impurities to form higher boiling reaction products. In accordance with the present invention, this reaction is effected concomitantly with or immediately prior to fractionation of the hydrocarbon charge. During fractionation of the hydrocarbon charge, the higher boiling reaction products formed in the above manner are transferred to and commingled with the higher boiling products. This serves to remove the non-hydrocarbon impurities from the more valuable lower hydrocarbon boiling product. Effecting the reaction in this manner offers numerous advantages including (1) an improved method of removing the non-hydrocarbon impurities from the more valuable lighter hydrocarbons, (2) the fractionation at elevated temperature enhances the reaction of the anhydride with the non-hydrocarbon impurities and thereby accomplishes more complete reaction, and (3) because of the use of the high temperature, less reactive organic acid anhydrides may be used in the process.

In one embodiment the present invention relates to an improvement in the fractionation at an elevated temperature of a hydrocarbon admixed with at least one impurity selected from the group consisting of nitrogen-containing, sulfur-containing and oxygen-containing compounds, which comprises conducting said fractionation in the presence of an organic acid anhydride in a concentration sufficient to react with at least a portion of said impurity and to thereby form a higher boiling reaction product, withdrawing from said fractionation a light hydrocarbon fraction reduced in said impurity and separately withdrawing a heavier fraction containing said reaction product.

As hereinbefore set forth, the novel process of the present invention may be used for the purification of any hydrocarbon charge containing the non-hydrocarbon impurities hereinbefore set forth. In one embodiment, the present invention may be used during the distillation (fractionation) of crude oil or fractions thereof which is effected to separate the same into individual fractions. For example, crude oil is fractionated in a crude column to separate an overhead gasoline fraction, one or more side streams and to leave a heavy bottoms product. In other cases, selected hydrocarbon fractions are subjected to catalytic or non-catalytic high temperature conversion and the effluent products then are separated to recover one or more converted products. For example, gas oil is subjected to catalytic cracking and the effluent products from the cracking reactor are fractionated to separate gasoline, one or more mid-boiling products and higher boiling oil. In still other cases, normally gaseous hydrocarbons contain mercaptans, etc., and, in accordance with the present invention, may be fractionated to separate an overhead gaseous product reduced in the non-hydrocarbon impurities.

The invention is explained further with reference to the accompanying flow diagrammatic drawing. In the interest of simplicity, the description of the drawing will be directed to the fractionation of crude oil. However, it is understood that this description illustrates but one embodiment of the invention and that the novel features thereof also are applicable to the treatment of other hydrocarbon fractions containing the non-hydrocarbon impurities.

Referring to the drawing, the crude oil is introduced to the process through line 1 and is directed through heat exchanger 2. For efficiency purposes, it is general practice to partly heat the incoming charge by passing it into heat exchange with the hot effluent products from the fractionator. It is understood that all or a portion of the crude oil charge may by-pass the heat exchanger if advantages appear therefor. The partly heated crude oil then is heated to the temperature desired for subsequent fractionation. In the case here illustrated, the partly heated crude oil is passed through line 3, into and through heating coils 4 positioned in furnace 5, and then is passed through line 6 into fractionator 7. While a conventional heater or furnace 5 is illustrated in the drawing, it is understood that any other suitable means of heating the crude oil to the desired temperature may be employed.

In accordance with the present invention, an organic acid anhydride is introduced into the process through line 8 and is commingled wtih the crude oil charge prior to or during fractionation. In one embodiment the organic acid anhydride may be directed by way of line 9 into line 1 to commingle therein with the crude oil charge. In another embodiment the organic acid anhydride may be commingled with the crude oil charge after the heat exchange and, in this embodiment, the organic acid anhydride is passed through line 8 into line 3 and commingled therein with the crude oil charge. In still another embodiment, the organic acid anhydride is commingled with the crude oil charge after the latter has passed through the heater and, in this embodiment, the organic acid anhydride is directed by way of lines 8 and 10 into line 6 to commingle therein with the heated crude oil charge.

In most cases steam is introduced into crude columns. In such cases, it is desirable to commingle the organic acid anhydride with the crude oil before the crude oil enters the crude column so that reaction of the organic acid anhydride with the water vapor is avoided. Accordingly, in such cases it is preferred that the organic acid anhydride is commingled with the crude oil charge either in line 1 before entering the heat exchanger or in line 3 before entering the heater. However, in fractionations in which H$_2$O is absent, the organic acid anhydride may be commingled with the heated charge just before the latter enters the fractionator, or it may be introduced into the fractionator directly in any suitable manner, or it may be commingled with the condensate being returned to the upper portion of the fractionator to serve as a cooling and refluxing medium therein.

Acetic anhydride is particularly preferred for use in accordance with the present invention. Other suitable organic acid anhydrides may be employed. Other anhydrides include those of propionic, butyric, valeric, stearic, phthalic, benzoic, etc. As hereinbefore set forth, because the reaction is effected at the elevated temperature of the heating and/or fractionation, less reactive organic acid anhydrides may be used. Furthermore, under these higher temperature conditions, more complete reaction of the organic acid anhydride with the non-hydrocarbon impurities is effected.

The temperature employed in heater 5 and/or in the lower portion of fractionator 7 will depend upon the particular crude oil being fractionated and the specific products desired. In general, this temperature will be within the range of from about 500° to about 650° F., although lower or higher temperatures may be employed in some cases. Crude columns generally are operated at pressures below about 50 pounds per square inch although, here again, higher pressures may be employed if advantages appear therefor. It is understood that a different temperature and pressure range may be employed in the fractionation of effluent products from a catalytic or non-catalytic high temperature conversion reaction zone, particularly in the use of higher pressures during the fractionation of the reactor effluent products, which pressures may range atmospheric to 2000 pounds per square inch or more. In still other cases, subatmospheric pressures may be employed.

As hereinbefore set forth, the organic acid anhydride and the non-hydrocarbon impurities react to form high boiling reaction products. The high boiling fraction products are collected in the higher boiling hydrocarbon products withdrawn from the lower portion of fractionator 7 through line 11. When heat exchanger 2 is in operation, the higher boiling products are passed into and through this exchanger and are withdrawn from the process through line 12.

In the absence of the novel features of the present invention, the non-hydrocarbon impurities would be distributed throughout the boiling range of the crude oil. Accordingly, the more valuable low boiling hydrocarbon fractions would contain these impurities. However, in accordance with the present invention, the more valuable lower boiling hydrocarbon fraction, withdrawn from the upper portion of fractionator 7 through line 13, will be considerably reduced, if not substantialy free, from the non-hydrocarbon impurities. The low boiling fraction withdrawn through line 13 generally will comprise naphtha or gasoline components and may have an end boiling point within the range of from about 250° to about 425° F. The overhead fraction withdrawn through line 13 is passed into and through cooler 14 and then is directed through line 15 to receiver 16. Receiver 16 contains conventional gas release line 17, as well as line 18 for the withdrawal of water when present. The condensate in receiver 16 is withdrawn therefrom through line 19 and may be removed from the process through an extension of this line. A portion thereof is returned by way of line 22 to the upper portion of fractionator 7 to serve as a cooling and refluxing medium therein. One or more side streams may be withdrawn from fractionator 7 by way of lines 23 and/or 24.

The organic acid anhydride is introduced into the system in a concentration sufficient to react with at least a portion of the non-hydrocarbon impurities. For optimum results, the organic acid anhydride is introduced in stoichiometric quantities to react with the non-hydrocarbon impurities and thus will vary with the concentration of impurities in the hydrocarbon charge. In general, this will be within the range of from about 0.001% to about 1% by weight of the hydrocarbon charge and more generally from about 0.01% to about 0.5% by weight of the hydrocarbon charge. However, in most cases, an excess of the organic acid anhydride is used to insure complete reaction with the non-hydrocarbon impurities.

As a result of the treatment hereinbefore described, the effluent products from the fractionator may contain acidic components and preferably are treated with an alkaline material to neutralize the acidity. In the case illustrated in the drawing, the light hydrocarbon product is directed by way of lines 19, 25 and 26 to alkaline treating zone 27. In one embodiment, this zone comprises a caustic wash zone in which caustic (sodium hydroxide) is introduced by way of line 28 and intimately contacted in zone 27 with the light hydrocarbon products introduced thereto through line 26. The caustic preferably is an aqueous solution and may range from 2° to 48° Baumé. In some cases alcohol or other organic solvents may be used, all or in part, to form the caustic solution. While caustic solution is preferred, it is understood that any other suitable alkaline reagents may be employed including particularly potassium hydroxide solution. Other alkaline solutions include lithium hydroxide solution, cesium hydroxide solution, as well as solutions of the alkaline earth metals including solutions of strontium hydroxide, calcium hydroxide or barium hydroxide. In some cases mixtures of alkaline reagents hereinbefore set forth may be used.

The alkaline treatment may be effected in either batch or continuous type of operation. Regardless of the method employed, the treated hydrocarbon fraction is withdrawn from the upper portion of zone 27 through line 29, while the spent treating solution is withdrawn therefrom through line 30. It is understood that the spent treating solution may be regenerated in any suitable manner and reused in the process. The alkaline treatment generally is effected at ambient temperature, although elevated temperatures up to about 200° F., may be used when desired. The pressure employed in zone 27 will range from atmospheric to 1000 pounds per square inch or more.

When desired, the side streams withdrawn through lines 23 and/or 24 also may be subjected to alkaline treatment in a manner similar to that described above. These treatments may be effected in blocked out operation; that is, the different fractions are stored separately and each fraction then is treated successively in zone 27. In the interest of simplicity, this is illustrated in the drawing by passing the side stream from line 23 through line 31 and the side stream from line 24 through line 26 to zone 27. Generally, however, the streams each will be subjected to alkaline treatment in separate zones, which may be continuous or batch type. For example, when the side stream withdrawn through line 23 and/or line 24 is to be subjected to catalytic cracking, the side stream is or the side streams are subjected to alkaline treatment prior to being sent to the catalytic cracking system.

In the interest of simplicity, valves, pumps, additional heaters, coolers, heat exchangers and similar appurtenances have been omitted. It is understood that these will be supplied as required. For example, suitable valves will be disposed in lines 25, 26 and 31 as required in order to control the flow of the streams to zone 27.

From the hereinbefore description, it will be seen that the present invention provides a novel method of converting non-hydrocarbon impurities contained in hydrocarbon fractions and, as hereinbefore set forth, the process offers numerous advantages, including more complete reaction and ready removal of the non-hydrocarbon impurities from the more valuable lower boiling hydrocarbon fractions.

As a specific example of an operation of the type illustrated in the drawing, 0.05% by weight of acetic acid anhydride is commingled with the crude oil charge prior to heat exchange and subsequent heating. The fractionator (crude column) is maintained at a temperature in the lower section thereof of about 550° F. The light fraction withdrawn from the upper portion of the fractionator has an end boiling point of 400° F. A kerosene side stream is withdrawn from line 23 and will have an end boiling point of about 525° F. A diesel oil side stream is withdrawn from line 24 and will have an end boiling point of about 650° F. Each of these streams is given a caustic wash treatment in separate zones, each of which employ aqueous caustic solutions of 10° Baumé and all of these caustic wash treatments are effected at ambient temperature.

I claim as my invention:

1. In the fractionation at an elevated temperature of a hydrocarbon admixed with at least one impurity selected from the group consisting of nitrogen-containing, sulfur-containing and oxygen-containing compounds, the improvement which comprises conducting said fractionation in a vertical fractionation zone in the presence of an organic acid anhydride selected from the group consisting of acetic, propionic, butyric, valeric, stearic, phthalic and benzoic anhydrides in a concentration sufficient to react with at least a portion of said impurity and to thereby form a higher boiling reaction product, withdrawing from the upper portion of said fractionation zone a light vaporous hydrocarbon fraction reduced in said impurity, and separately withdrawing from the lower portion of said zone a heavier residual fraction containing said reaction product.

2. In the fractionation of crude oil admixed with at least one impurity selected from the group consisting of nitrogen-containing, sulfur-containing and oxygen-containing compounds, the improvement which comprises commingling an organic acid anhydride selected from the group consisting of acetic, propionic, butyric, valeric, stearic, phthalic and benzoic anhydrides with said crude oil and heating the mixture to a temperature of from about 500° to about 650° F., passing the heated mixture into a fractionating column and therein separating a light vaporous fraction substantially reduced in said impurity and a high boiling residual fraction containing said impurity as a high boiling reaction product of the anhydride and the impurity, and separately removing said vaporous and residual fractions from the upper and lower portions, respectively, of said column.

3. The method of claim 2 further characterized in that said anhydride is acetic acid anhydride.

4. In the fractionation at an elevated temperature of a gas oil fraction admixed with at least one impurity selected from the group consisting of nitrogen-containing, sulfur-containing and oxygen-containing compounds, the improvement which comprises conducting said fractionation in a vertical fractionation zone in the presence of an organic acid anhydride selected from the group consisting of acetic, propionic, butyric, valeric, stearic, phthalic and benzoic anhydrides in a concentration sufficient to react with at least a portion of said impurity and to thereby form a higher boiling reaction product, withdrawing from the upper portion of said fractionation zone a vaporous fraction reduced in said impurity, and separately withdrawing from the lower portion of said zone a residual fraction containing said reaction product.

References Cited in the file of this patent

UNITED STATES PATENTS

| | | |
|---|---|---|
| 1,974,311 | Levine | Sept. 18, 1934 |
| 2,068,850 | Ellis | Jan. 26, 1937 |
| 2,098,059 | Morrell | Nov. 2, 1937 |
| 2,511,251 | Feasley | June 13, 1950 |
| 2,567,174 | Arundale et al. | Sept. 11, 1951 |
| 2,768,122 | Wilson | Oct. 23, 1956 |
| 2,773,805 | Vanderbilt et al. | Dec. 11, 1956 |